(12) United States Patent
Marka et al.

(10) Patent No.: US 10,729,124 B2
(45) Date of Patent: Aug. 4, 2020

(54) APPARATUS TO EFFECT AN OPTICAL BARRIER TO PESTS

(71) Applicant: The Trustees of Columbia University in the City of New York, New York, NY (US)

(72) Inventors: Szabolcs Marka, New York, NY (US); Imre Bartos, New York, NY (US); Zsuzsanna Marka, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 105 days.

(21) Appl. No.: 16/066,904

(22) PCT Filed: Jan. 4, 2017

(86) PCT No.: PCT/US2017/012137
§ 371 (c)(1),
(2) Date: Jun. 28, 2018

(87) PCT Pub. No.: WO2017/120196
PCT Pub. Date: Jul. 13, 2017

(65) Prior Publication Data
US 2019/0008136 A1 Jan. 10, 2019

Related U.S. Application Data

(60) Provisional application No. 62/274,661, filed on Jan. 4, 2016.

(51) Int. Cl.
*F21V 14/02* (2006.01)
*A01M 29/10* (2011.01)
(Continued)

(52) U.S. Cl.
CPC ............ *A01M 29/10* (2013.01); *A01M 1/026* (2013.01); *F21V 14/02* (2013.01); *F21V 14/04* (2013.01);
(Continued)

(58) Field of Classification Search
CPC ........... F21K 9/232; F21V 14/02; F21V 21/30
See application file for complete search history.

(56) References Cited

U.S. PATENT DOCUMENTS

| 3,633,199 A | 1/1972 | Curry et al. |
| 4,942,868 A | 7/1990 | Vago |

(Continued)

FOREIGN PATENT DOCUMENTS

| CN | 204104570 | 1/2015 |
| WO | 2004/041314 | 5/2004 |

(Continued)

OTHER PUBLICATIONS

International Search Report and Written Opinion, International Patent Application No. PCT/US2017/012137, dated Mar. 17, 2017, pp. 1-14.

(Continued)

*Primary Examiner* — Thanh Luu
(74) *Attorney, Agent, or Firm* — Beusse Wolter Sanks & Maire; Eugene J. Molinelli; Cian G. O'Brien

(57) ABSTRACT

An apparatus is provided for effecting an optical barrier and includes a light source emitting a beam. The apparatus also includes a moveable mirror and an actuator to move the mirror to reflect the beam into a plurality of directions or locations. In some embodiments, the apparatus also includes a processor and a memory chip including a sequence of instructions. The memory chip and the sequence of instructions causes the processor to receive data from a sensor system that indicates a location of a pest and operate the
(Continued)

actuator to move the mirror to direct the beam to sweep through a range of directions that include the location of the pest. A light fixture is also provided, that includes the apparatus.

12 Claims, 15 Drawing Sheets

(51) Int. Cl.
    *A01M 1/02*     (2006.01)
    *G01S 17/04*     (2020.01)
    *F21V 14/04*     (2006.01)
    *F21V 21/15*     (2006.01)
    *F21Y 115/10*     (2016.01)

(52) U.S. Cl.
    CPC .............. *F21V 21/15* (2013.01); *G01S 17/04* (2020.01); *F21Y 2115/10* (2016.08)

(56) References Cited

U.S. PATENT DOCUMENTS

| | | | |
|---|---|---|---|
| 5,048,520 A | 9/1991 | Vago | |
| 5,343,652 A * | 9/1994 | Johnson | A01M 1/02 43/132.1 |
| 5,408,389 A * | 4/1995 | Burlingame | F21S 10/06 362/284 |
| 5,611,993 A | 3/1997 | Babaev | |
| 5,616,845 A | 4/1997 | Hickling et al. | |
| 5,721,692 A | 2/1998 | Nagaya | |
| 5,915,949 A | 6/1999 | Johnson | |
| 6,046,834 A | 4/2000 | Asada et al. | |
| 6,125,446 A | 9/2000 | Olarig et al. | |
| 6,250,255 B1 | 6/2001 | Lenhardt et al. | |
| 6,298,011 B1 | 10/2001 | Nyberg et al. | |
| 6,362,736 B1 | 3/2002 | Gehlot | |
| 6,653,971 B1 | 11/2003 | Guice et al. | |
| 6,718,681 B2 | 4/2004 | Bhullar | |
| 6,853,328 B1 | 2/2005 | Guice et al. | |
| 6,914,529 B2 | 7/2005 | Barber et al. | |
| 6,914,854 B1 | 7/2005 | Heberley et al. | |
| 7,071,829 B2 | 7/2006 | Gardner, Jr. et al. | |
| 7,286,056 B2 | 10/2007 | Kates | |
| 7,373,254 B2 | 5/2008 | Pierce | |
| 7,696,857 B2 | 4/2010 | Kritt et al. | |
| 7,799,146 B2 | 9/2010 | McLoughlin et al. | |
| 8,043,511 B2 | 10/2011 | Holland | |
| 8,155,017 B2 | 4/2012 | Bolgiano | |
| 8,164,462 B1 | 4/2012 | Bose et al. | |
| 8,217,772 B2 | 7/2012 | Morgan et al. | |
| 8,400,348 B1 | 3/2013 | Guice et al. | |
| 8,705,017 B2 | 4/2014 | Hyde et al. | |
| 8,810,411 B2 | 8/2014 | Marka et al. | |
| 9,944,541 B2 | 4/2018 | Szabolcs | |
| 2002/0048388 A1 | 4/2002 | Hagihara | |
| 2002/0144452 A1 | 10/2002 | Beroza | |
| 2003/0101634 A1 | 6/2003 | Bhellar | |
| 2004/0154213 A1 | 8/2004 | Mosher | |
| 2005/0226287 A1 | 10/2005 | Shah et al. | |
| 2006/0023452 A1 * | 2/2006 | Lai | F21V 7/0008 362/253 |
| 2006/0215885 A1 | 9/2006 | Kates | |
| 2006/0233049 A1 | 10/2006 | Cilliers | |
| 2006/0273172 A1 | 12/2006 | Helez et al. | |
| 2007/0021915 A1 | 1/2007 | Breed | |
| 2007/0117574 A1 | 5/2007 | Watanabe | |
| 2007/0185587 A1 | 8/2007 | Kondo | |
| 2008/0068157 A1 | 3/2008 | Ikemori | |
| 2008/0257830 A1 | 10/2008 | Wu et al. | |
| 2009/0190355 A1 | 7/2009 | DeGinto et al. | |
| 2009/0201152 A1 | 8/2009 | Karr | |
| 2010/0226122 A1 | 9/2010 | Tsai et al. | |
| 2010/0229458 A1 | 9/2010 | Bowden et al. | |
| 2010/0286803 A1 | 11/2010 | Tillotson et al. | |
| 2012/0026732 A1 | 2/2012 | Fricke | |
| 2012/0184245 A1 | 7/2012 | Nomachi | |
| 2014/0225003 A1 | 8/2014 | Koo et al. | |
| 2014/0240088 A1 | 8/2014 | Robinette | |
| 2015/0253414 A1 | 9/2015 | Chan et al. | |
| 2015/0345762 A1 * | 12/2015 | Creasman | H05B 33/08 362/428 |
| 2016/0094508 A1 | 3/2016 | Nomura | |
| 2016/0195602 A1 | 7/2016 | Meadow | |

FOREIGN PATENT DOCUMENTS

| | | |
|---|---|---|
| WO | 2005/022991 | 3/2005 |
| WO | 2006/029249 | 3/2006 |
| WO | 2014/024052 | 2/2016 |
| WO | 2017/066513 | 4/2017 |
| WO | 2017/120189 | 7/2017 |

OTHER PUBLICATIONS

Barnett, S.B. et al., "Review: Current status of research on biophysical effects of ultrasound," Ultrasound in Medicine & Biology, 1994, pp. 205-218, vol. 20, Issue 3.

Bertoldo, S., et al., "A Wireless Sensor Network Ad-Hoc Designed as Anti-Theft Alarm System for Photovoltaic Panels," Wireless Sensor Network, Apr. 2012, pp. 107-112, vol. 4, No. 4.

Chen, Y., et al., "Flying Insect Detection and Classification with Inexpensive Sensors," Journal of Visualized Experiments, Oct. 2014, Issue 92.

Child, S. Z. et al., "Effects of ultrasound on *Drosophila*: III. Exposure of larvae to low-temporal-average-intensity, pulsed irradation," Ultrasound in Medicine & Biology, 1981, pp. 167-173, vol. 7, Issue 2.

Child, S. Z., et al., "Effects of ultrasound on *Drosophila*—IV. Pulsed exposures of eggs," Ultrasound in Medicine & Biology, 1982, pp. 311-312, vol. 8, Issue 3.

Child, S.Z., et al., "The sensitivity of *Drosophila* larvae to continuous-wave ultrasound," Ultrasound in Medicine & Biology, 1992, pp. 725-728, vol. 18, Issue 8.

Enayati, A., et al., "Electronic mosquito repellents for preventing mosquito bites and malaria infection (Review)," Cochrane Database of Systemic Reviews, 2007, pp. 1-19, Issue 2.

Fradin, M., "Mosquitoes and Mosquito Repellents: A Clinician's Guide," Ann Intern Med., 1998, pp. 931-940, vol. 128, Issue 11.

Guo, H., et al., "An Automotive Security System for Anti-theft," Eighth International Conference on Networks, Mar. 2009, pp. 421-426.

International Search Report and Written Opinion for PCT16/056963, dated Jan. 26, 2017, pp. 1-8.

International Search Report and Written Opinion for the corresponding PCT Application No. PCT/US2010/031437, dated Jun. 15, 2010, pp. 4-9.

International Search Report and Written Opinion for the corresponding PCT Application No. PCT/US12/56515, dated Dec. 4, 2012, pp. 17.

International Search Report and Written Opinion for the corresponding PCT Application No. PCT/US2017/012128, dated Mar. 30, 2017, pp. 1-7.

Kok, L., "Mosquitoes Vanish With Zapping Wand", The Straits Times, Sep. 18, 2010, p. D9.

Lemaire, X., "Off-grid electrification with solar home systems: The experience of a fee-for-service concession in South Africa," Energy for Sustainable Development, Sep. 2011, pp. 277-283, vol. 15, No. 3.

McGraw, E.A., et al., "Beyond insecticides: new thinking on an ancient problem," Nature Reviews Microbiology, Mar. 2013, pp. 181-193, vol. 11.

Nam, V.S., et al., "Eradication of Aedes Aegypti from a Village in Vietnam, Using Copepods and Community Participation," Am. J. Trop. Med. Hyg., 1998, pp. 657-660, vol. 59 Issue 4.

Nyborg, W.L., "Biological effects of ultrasound: Development of safety guidelines. Part II: General review," Ultrasound in Medicine & Biology, Mar. 2001, pp. 301-333, vol. 27, Issue 3.

(56) References Cited

OTHER PUBLICATIONS

Raman, D.R., "Detecting insect flight sounds in the field: implications for acoustical counting of mosquitoes," Transactions of the ASABE, 2007, pp. 1481-1485, vol. 50, Issue 4.

Reynolds, D.R., et al., "Remote-sensing, telemetric and computer-based technologies for investigating insect movement: a survey of existing and potential techniques," Computers and Electronics in Agriculture, 2002, pp. 271-307, vol. 35.

Sperling, G., et al., "Three theories of stroboscopic motion detection," Spatial Vision, 1985, pp. 47-56, vol. 1, Issue 1.

Visconti, P., et al., "Intelligent system for monitoring and control of photovoltaic plants and for optimization of solar energy production," IEEE 15th International Conference on Environment and Electrical Engineering, Jun. 2015, pp. 1-6

Zittrain, J., "The Case for Kill Switches in Military Weaponry," Scientific American, Sep. 2014, pp. 1-5.

\* cited by examiner

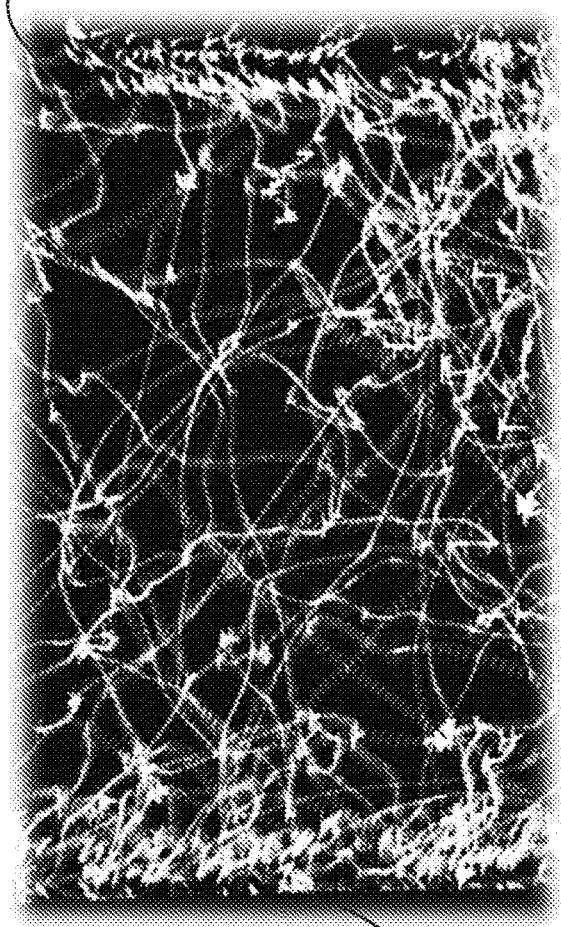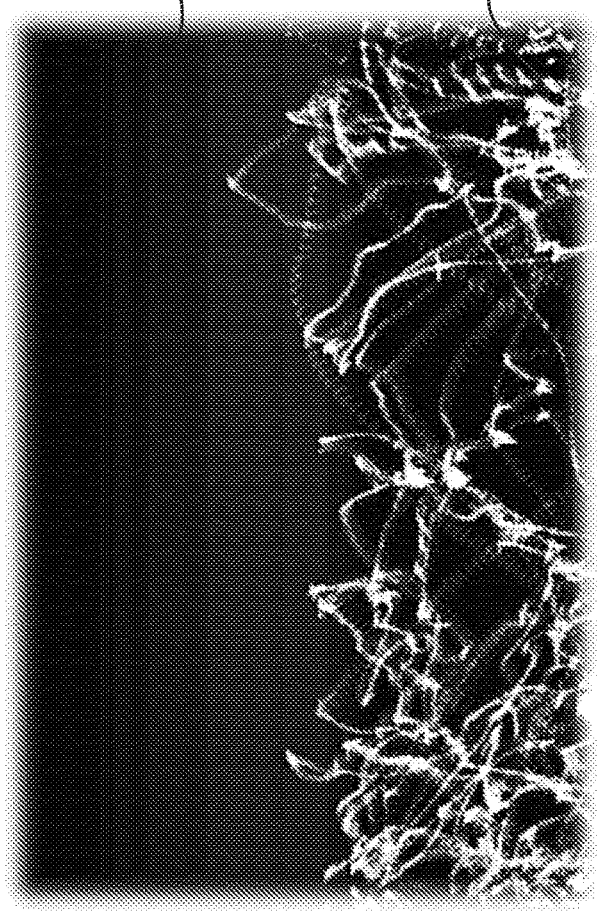

APPARATUS TO EFFECT AN OPTICAL BARRIER TO PESTS

CROSS-REFERENCE TO RELATED APPLICATIONS

This application is a 371 national stage application of PCT Application No. PCT/US2017/012137 filed Jan. 4, 2017 which claims benefit of Provisional Application No. 62/274,661, filed Jan. 4, 2016, under 35 U.S.C. § 119(e), the entire contents of which are hereby incorporated by reference as if fully set forth herein.

BACKGROUND

Insects serve as pests and disease vectors. For example, the *Anopheles gambiae* and *Aedes aegypti* mosquito not only annoys humans and livestock by biting but also spreads malaria and Dengue fever. Similarly, tsetse flies are biological vectors of trypanosomes, which cause human sleeping sickness and animal trypanosomiasis. Triatominae (kissing bugs) spread Chagas disease.

Locating, measuring, and interacting with such swarms in real time as they form has been extremely difficult on the field. Reliable tracking of individual pests unobtrusively as they traverse the home, village or the wild has not been demonstrated. Trap-less counting and characterization of pest populations around humans has not been achieved.

Mosquito control is still an unsolved problem in many developing countries. Malaria is epidemic in many places, including sub-Saharan Africa where the majority of the Earth's malaria fatalities occur. Generic control measures rely on toxic chemical and biological agents, while repellents in conjunction with mosquito nets provide additional defense. While these are efficient, they also pose direct danger and serious discomfort to users, albeit small when compared to the grave dangers of malaria. Traditional measures seem to be approaching their peak efficiency in practice, while the malaria epidemic is still ongoing.

As stated above, various approaches employ toxic materials. For example, Tillotson et al. (US Patent application Publication 2010/0286803) describes a system for dispensing fluid (such as insect repellant) in response to a sensed property such as an ambient sound (e.g., known signatures of insect wing beat frequencies and their harmonics). These are proximity sensors that determine that an insect is close enough to warrant fluid dispensing when the amplitude of the wing beat frequency exceeds some threshold value over the background noise.

SUMMARY

Techniques are provided for effecting an optical barrier to pests, including an apparatus that provides an optical barrier to scan a surface or a volume and effect an optical barrier to pests.

In a first set of embodiments, an apparatus is provided for effecting an optical barrier and includes a light source emitting a light beam. The apparatus also includes a moveable mirror and an actuator to move the mirror to reflect the beam into a plurality of directions or locations. The apparatus also includes a processor and a memory chip including a sequence of instructions. The memory chip and the sequence of instructions causes the processor to receive data from a sensor system that indicates a location of a pest and operate the actuator to move the mirror to direct the beam to sweep through a range of directions that include the location of the pest.

In a second set of embodiments, a light fixture is provided that includes the apparatus of the first set of embodiments.

In a third set of embodiments, an apparatus is provided for effecting an optical barrier and includes a base rotatably mounted to a surface to translate the apparatus or rotate the apparatus relative to the surface about a vertical axis. The apparatus also includes a horizontal bar mounted to the base and a pair of vertical bars mounted to the horizontal bar. The apparatus further includes a horizontal member rotatably mounted to the pair of vertical bars such that the horizontal member is configured to rotate about a horizontal axis. The apparatus further includes a light source emitting a light beam and an actuator to rotate the base and/or the horizontal member to direct the beam in a range of angles in at least one plane of rotation. The apparatus further includes a processor and a memory chip with a sequence of instructions and data that indicates a location of a pest. The memory chip and sequence of instructions causes the processor to operate the actuator to rotate the base and/or the horizontal member to direct the beam to sweep through the range of angles that include the location of the pest.

In a fourth set of embodiments, an apparatus is provided for effecting an optical barrier and includes a transparent bulb with a screw-in light bulb base configured for electrical connection to a light fixture socket. The apparatus also includes a light source disposed inside the bulb and configured to emit a beam of light when power is supplied to the light fixture socket. The apparatus also includes an optical coupler disposed inside the bulb and an actuator disposed inside the bulb. The actuator is configured to move the optical coupler or light source to direct the beam into a plurality of directions or locations when power is supplied to the light fixture socket.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 10B is a front view that illustrates an example of a time lapse travel path of pests along a chamber before an optical barrier separates the chamber into first and second regions, according to an embodiment;

FIG. 10C is a front view that illustrates an example of a time lapse travel path of pests along the chamber of FIG. 10B after the optical barrier separates the chamber into first and second regions, according to an embodiment;

DETAILED DESCRIPTION

A system is described to effect an optical barrier to pests, including an apparatus with a light source that scans a light beam in a range of directions including a location of a pest. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of a system to effect an optical barrier for pests. However, the invention is not limited to this context. In other embodiments, a system is provided for using light to guide pest movement into one or more traps, sticky traps, high voltage traps, physical barriers, sensors, and examination equipment. In other embodiments, the system is provided for using light to guide pest movement away from humans and animals (e.g. breeding grounds). Additionally, in other embodiments, a system is provided for protecting a resting surface or full volume from pests and not just placing a barrier along a perimeter of the volume.

1. Overview

Figure 1:
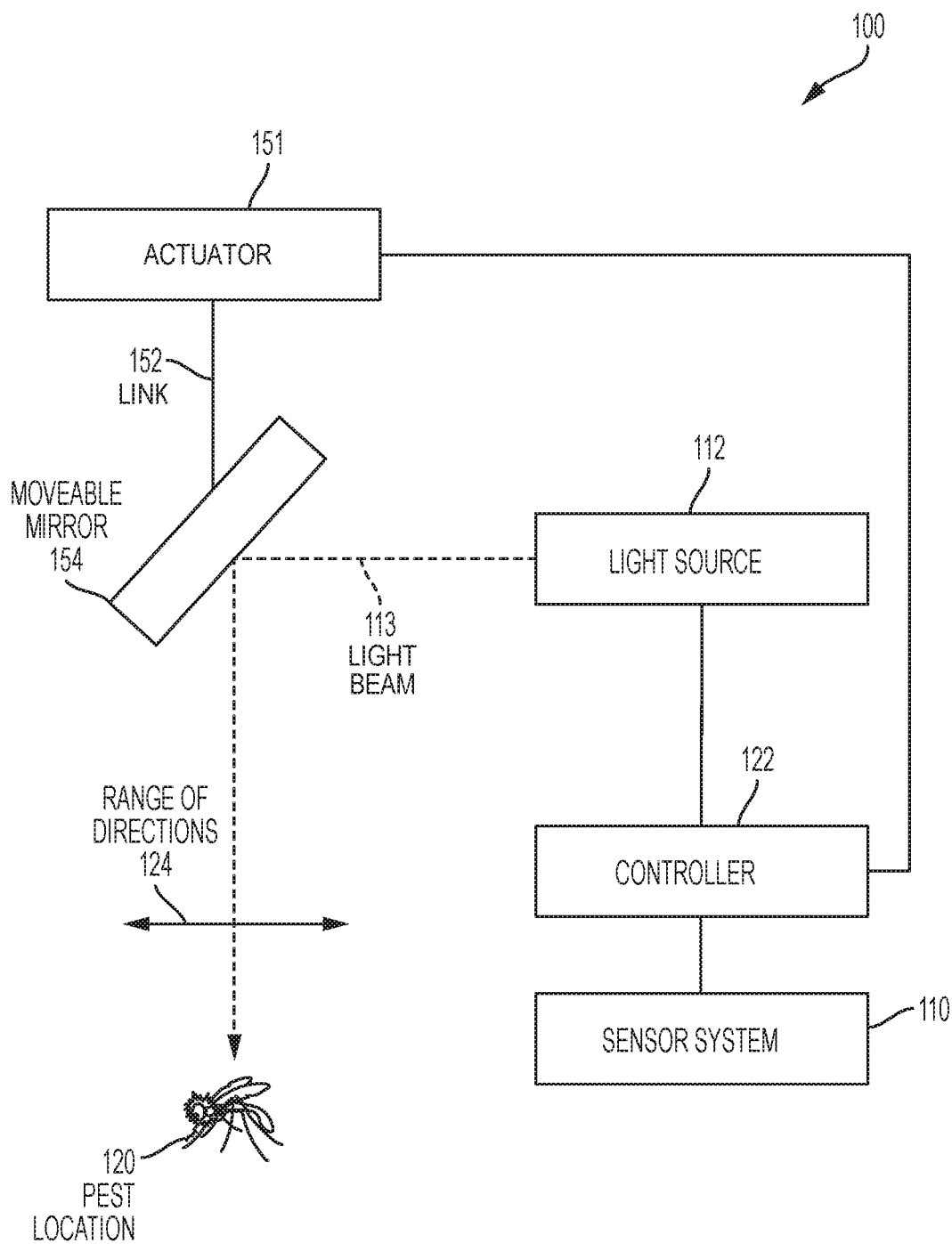
FIG. 1 is a block diagram that illustrates an example of an apparatus to effect an optical barrier to pests, according to one embodiment.

FIG. 1 is a block diagram that illustrates an example of an apparatus 100 to effect an optical barrier to pests, according to one embodiment. The apparatus 100 includes a light source 112 to emit a light beam 113 that is incident on a moveable mirror 154 or other optical coupler. An optical coupler includes any space, object or device that is used to direct light from a source to a target, including free space, a vacuum, glass or plastic or other transparent material, a filter, an polarizer, a mirror, a lens, a beam splitter, an optical fiber, a circulator, a grating, a prism, collimator, an acoustic optic modulator (AOM), an aperture, a shutter, among others, in any multiple, alone or in some combination. The light source 112 can be any source of light, such as a laser, a light emitting diode (LED), or the sun, where the beam 113 is carried in free space or within an optical coupler. In an example embodiment, the light source 112 itself can be moved, in addition to, or instead of, the moveable mirror 154 or other optical coupler.

An actuator 151 is coupled by a link 152 to the moveable mirror 154 or other optical coupler (or light source 112) to move the mirror 154 (or other coupler or light source) such that the beam 113 is directed into a plurality of directions or locations. In some embodiments, the actuator 151 is a motor that is mechanically coupled by a mechanical link 152 to the movable mirror 154 or other couple coupler or light source 112. In other embodiments, the actuator 151 is magnetically coupled or coupled by any other means appreciated by one of skill in the art by the link 152 to the moveable mirror 154 or other optical coupler or light source 112. In some embodiments, the actuator 151 is a stepper motor and the mechanical link 152 is a rod, a rail, or an articulated lever. In other embodiments, the actuator 151 is a servo motor or any type of motor known to one skilled in the art. In other embodiments, the actuator 151 is a rotating motor and the mechanical link 152 is a chain and pulley system. In other embodiments, other types of actuators such as pneumatic, hydraulic, shape memory alloy, magnetic, electrostatic, vacuum, piezoelectric and linkages are involved, alone or in some combination.

In an embodiment, the beam 113 has an optical wavelength in a near infrared (NIR) band or any spectral band described in U.S. Pat. No. 8,810,411, which is incorporated by reference herein. In another embodiment, the NIR band is in a range of 800-870 nanometers (nm). In another embodiment, the beam 113 has a dispersion angle of less than ±20 degrees and more preferably has a dispersion angle of less than ±10 degrees. In another embodiment, an intensity of the beam 113 is in a range of 3.5-4.5 Watts/centimeter$^2$ (W/cm$^2$), for example, which is advantageous for affecting the movement of several insects and species.

The apparatus 100 includes a sensor system 110 that determines a location 120 of a pest. In some embodiments, the sensor system 110 includes optical sensors, acoustic sensors, light detection and ranging (LIDAR) sensors, sound navigation and ranging (SONAR) sensors, or any type of sensor appreciated by one skilled in the art or some combination. The sensor system 110 then transmits data indicating the location 120 of the pest to a controller 122. In some embodiments, one controller 122 is employed. In other embodiments, more than one controller 122 is used. In an example embodiment, the sensor system 110 determines the location and trajectory of multiple pests and sequentially transmits data indicating the location of each pest to the controller 122 as they arrive. After receiving this data, the controller 122 determines how to move the mirror 154 or other optical coupler or light source 112, in order to sweep the beam 113 through a range of directions or locations 124 that include the location 120 of the pest. The controller 122 then transmits a signal to the actuator 151, to move the mirror 154 or other optical coupler or light source 112 and sweep the beam 113 through the range of directions or locations 124. In an embodiment, the range of directions or locations 124 is less than the total plurality of directions or locations that the beam 113 can be swept by the mirror 154 or other optical coupler or light source 112. Although FIG. 1 depicts a range of directions or locations 124, in one embodiment the beam 113 is directed in a single direction or location corresponding to the pest location 120. An advantage of targeting the pest location specifically is that the pest experiences an infinitely sharp "boundary" and is more likely to rapidly reverse its last movement, whether a direction of flight or alighting on a surface. In some embodiments, the controller 122 comprises one or more general purpose computer systems, as depicted in FIG. 12 or one or more chip sets as depicted in FIG. 13. In some embodiments, the controller is a dedicated circuit, such as a simple application specific integrated circuit (ASIC), circuit board or field-programmable gate array (FPGA).

In an embodiment, the sensor system 110 transmits data indicating the location 120 of the pest and an anticipated time of arrival of the pest at the location 120 to the controller 122. After receiving this data, the controller 122 first determines how to move the mirror 154 or other optical coupler or light source 112, in order to orient the beam 113 at the location 120 of the pest. The controller 122 then transmits a signal to the actuator 151, to move the mirror 154 or other optical coupler or light source 112 such that the beam 113 will be oriented at the location 120 of the pest. The controller 122 then transmits a signal to the light source 112 at the time of arrival of the pest at the location 120, to activate the light source 112 at the time of arrival. In an embodiment, the controller 122 transmits a signal to the light source 112, to deactivate the light source 112, not more than a threshold duration after the time of arrival. In an example embodiment, the threshold duration is not more than 300 milliseconds (ms). An advantage of this embodiment is that power is expended only long enough to cause the pest to react to the beam; thus, power is conserved at times when there is no longer expected to be a pest at the location. An additional advantage of this embodiment is that the reduced power expenditure simplifies the cooling requirements of the light source 112. In the event that another pest is expected at the location prior to the threshold duration after the time of arrival of the first pest, the controller 122 does not transmit the signal to deactivate the light source 112.

In some embodiments of the apparatus 100, the sensor system 110 and controller 122 are omitted. In one embodiment, the actuator 151 continuously moves the mirror 154 or other optical coupler or light source 112 to sweep the beam 113 through the range of directions or locations 124. In an example embodiment, a power supply (not shown) is connected to the actuator 151, moveable mirror 154 and light source 112 and continuously supplies electrical power to the actuator 151, moveable mirror 154 and light source 112. One advantage of this embodiment is to provide a continuous pest boundary along the range of directions or locations 124. In one embodiment, the range of directions or locations 124 is predetermined and the actuator 151 is configured such that the beam 113 is swept through the range of directions or locations 124 upon activation of the actuator 151. In another embodiment, the actuator 151 moves the mirror 154 or other optical coupler or light source 112 at predetermined time periods to sweep the beam 113 through the range of directions or locations 124 at the predetermined time periods. In this embodiment, the power supply (not shown) connected to the actuator 151, moveable mirror 154 and light source 112 is configured to supply electrical power to the actuator 151, moveable mirror 154 and light source 112 at the predetermined time periods. In yet another embodiment, the actuator 151 is manually activated by a user to move the mirror 154 or other optical coupler or light source 112 to sweep the beam 113 through the range of directions or locations 124. In one embodiment, the power supply (not shown) connected to the actuator 151, moveable mirror 154 and light source 112 is manually activated by the user to sweep the beam 113 through the range of directions or locations 124 and is manually deactivated by the user to turn off the beam 113.

Figure 2:
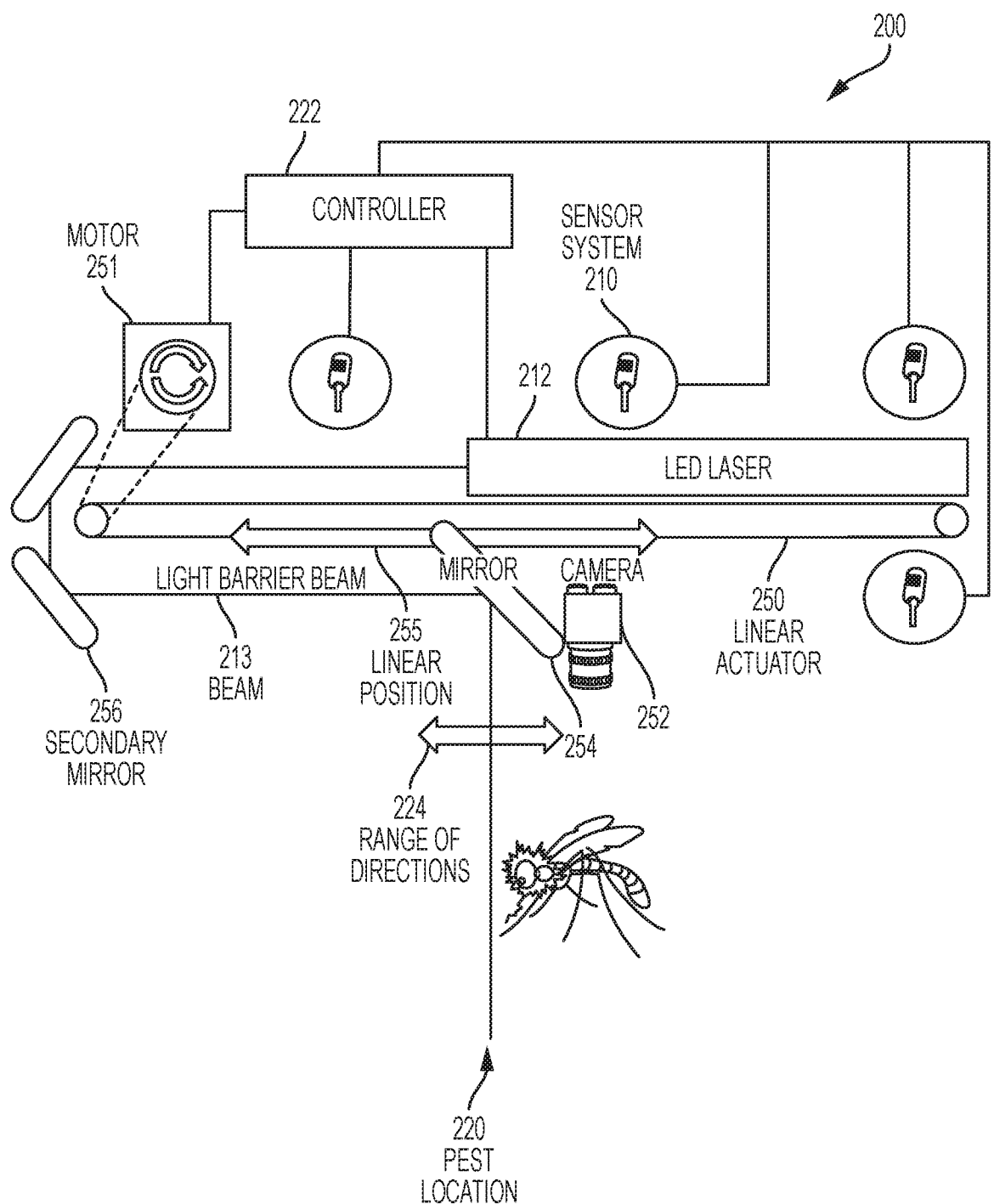
FIG. 2 is a block diagram that illustrates an example of an apparatus to effect an optical barrier to pests, according to another embodiment.

FIG. 2 is a block diagram that illustrates an example of an apparatus 200 to effect an optical barrier to pests, according to another embodiment. The apparatus 200 includes a moveable mirror 254 mounted on a linear actuator 250. The linear actuator 250 includes a motor 251 to adjust a linear position 255 of the mirror 254. A light source, such as a LED laser 212 emits a beam 213 that is redirected by secondary mirrors 256 to the moveable mirror 254. In one embodiment, as with the light source 112 of FIG. 1, the light source of FIG. 2 need not be the LED laser 212 and may be any laser, a LED or the sun. Based on the adjustment of the linear position 255 of the mirror 254, the beam 213 is reflected into a range of directions 224. In an example embodiment, the motor 251 is used to adjust a linear position of the LED laser 212 and consequently to direct the beam 213 into the range of directions 224, such that the mirror 254 is not used. In an embodiment, the motor 251 also adjusts a linear position of a camera 252 that is oriented along the reflected beam 213, to capture one or more images in the range of directions 224. In some embodiments, the camera 252 is part of the sensor system 210.

The apparatus 200 includes a sensor system 210 that determines a location 220 of a pest. In an embodiment, the sensor system 210 is an array of acoustical or optical sensors. The sensor system 210 then transmits data indicating the location 220 of the pest to a controller 222 via wired or wireless lines of communication. After receiving this data, the controller 222 determines a range of linear positions 255 to move the mirror 254, in order to sweep the beam 213 through a range of directions or locations 224 that includes the location 220 of the pest. The controller 222 then transmits a signal to the motor 251, to move the mirror 254 through the range of linear positions 255 and sweep the beam 213 through the range of directions or locations 224. Although FIG. 2 depicts a range of directions or locations 224, in one embodiment the beam 213 is directed in a single direction or location corresponding to the pest location 220.

Figure 3:
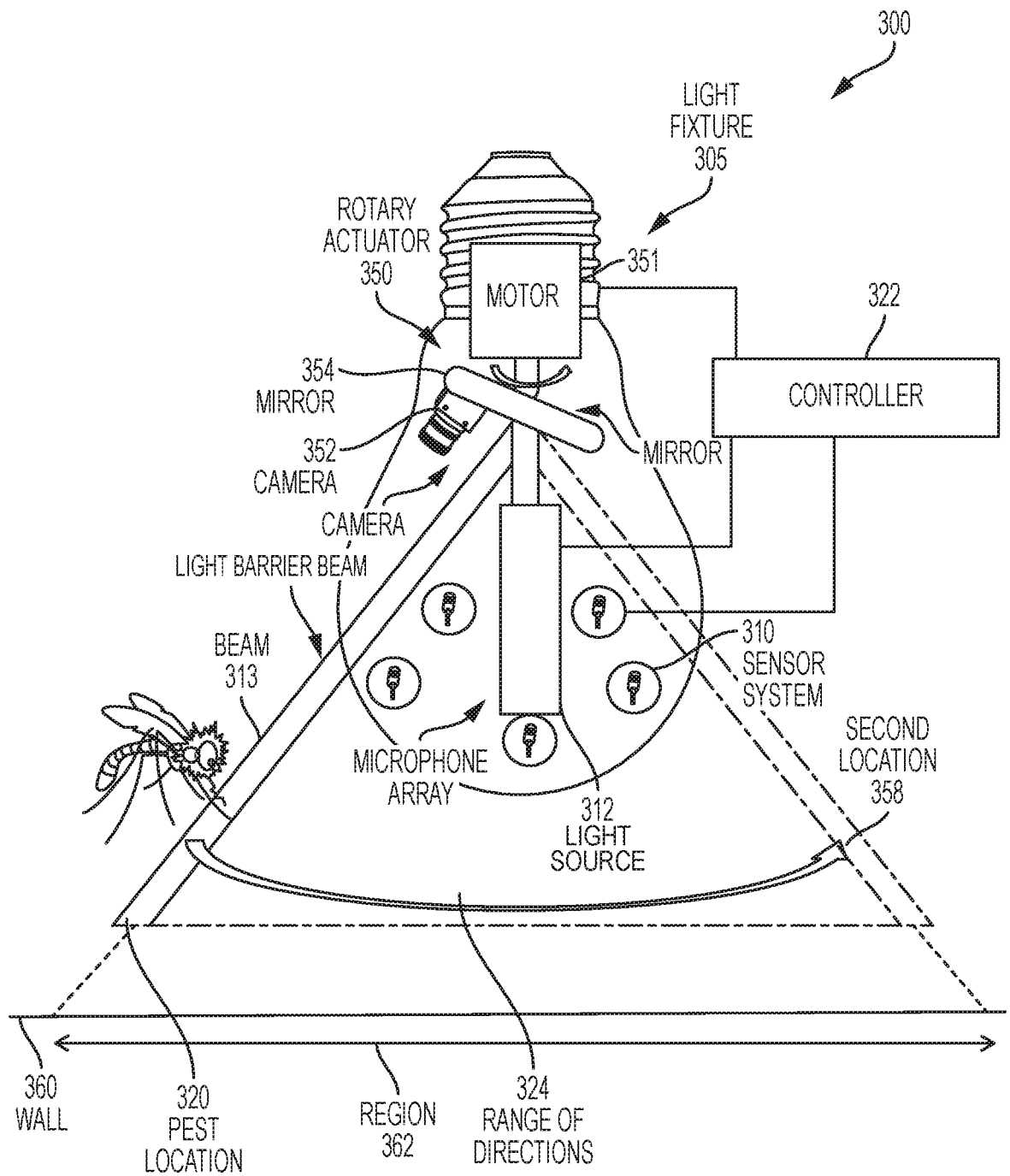
FIG. 3 is a block diagram that illustrates an example of an apparatus to effect an optical barrier to pets, according to still another embodiment.

FIG. 3 is a block diagram that illustrates an example of an apparatus 300 to effect an optical barrier to pests, according to another embodiment. In an embodiment, the apparatus 300 is embodied in a light fixture 305, such as a screw-in light bulb. However, the apparatus 300 need not be embodied in a light fixture.

The apparatus 300 includes a moveable mirror 354 mounted on a rotary actuator 350 that includes a motor 351 to adjust a rotational position of the mirror 354. A light source 312, such as a LED laser emits a beam 313 that is reflected off the mirror 354 into a range of directions 324 on a cone, based on the adjustment of the rotational position of the mirror 354. In one embodiment, as with the light source 112 of FIG. 1, the light source 312 of FIG. 3 need not be the LED laser and may be any laser, a LED or the sun. In an example embodiment, the motor 351 is used to adjust a rotational position of the light source 312 and consequently to direct the beam 313 into the range of directions 324, such that the mirror 354 is not used.

The apparatus 300 also includes a sensor system 310 that is similar to the sensor system 210 and is used to determine a location 320 of a pest. The sensor system 310 then transmits data indicating the location 320 of the pest to a controller 322. After receiving this data, the controller 322 determines a range of rotational positions to move the mirror 354, in order to sweep the beam 313 through the range of directions 324 that includes the location 320 of the pest. The controller 322 then transmits a signal to the motor 351, to move the mirror 354 through the range of rotational positions and sweep the beam 313 through the range of directions or locations 324.

In an embodiment, the sweep of the beam 313 extends from a first location 320 to a second location 358 to cover a region 362 on a distant wall 360. In an embodiment, the range of directions or locations 324 is less than a total plurality of directions or locations that the beam 313 can be swept by the mirror 354. Although FIG. 3 depicts a range of directions or locations 324, in one embodiment the beam 313 is directed in a single direction or location corresponding to the pest location 320. Although FIG. 3 depicts that the motor 351 adjusts the rotational position of the mirror 354 in the plane of FIG. 3, the motor 351 can also adjust the rotational position of the mirror 354 in a plane orthogonal to the plane of FIG. 3, to sweep the beam 313 through a range of directions or locations in a plane orthogonal to the plane of FIG. 3.

In a low cost simple embodiment, the sensor system 310 including camera 352 is omitted, the light fixture base fits a standard light fixture socket and the light source 312 and rotating mirror 354 sweep out a complete cone surface as long as the standard light fixture socket is electrified, e.g., by a wall switch or lamp switch. In the illustrated embodiment, the base of the light fixture is configured for a standard incandescent bulb socket. In other embodiments, the light fixture base is configured for other standard light fixture sockets, such as fluorescent bulb sockets, or halogen bulb sockets. Such an embodiment is suitable in a lamp disposed overhead in an area to be protected, such as a dining table or other eating area or a sleeping area, indoors or outdoors. The device can be turned on manually when the area is in use, and turned off manually when the area is vacated. In other embodiments, the device can be turned on automatically when the area is in use and is turned off automatically when the area is vacated. In an example embodiment, one or more motion sensors in the area to be protected are used to electrify the fixture socket when the area is in use and are used to turn off the fixture socket when the area is vacated.

Figure 4:
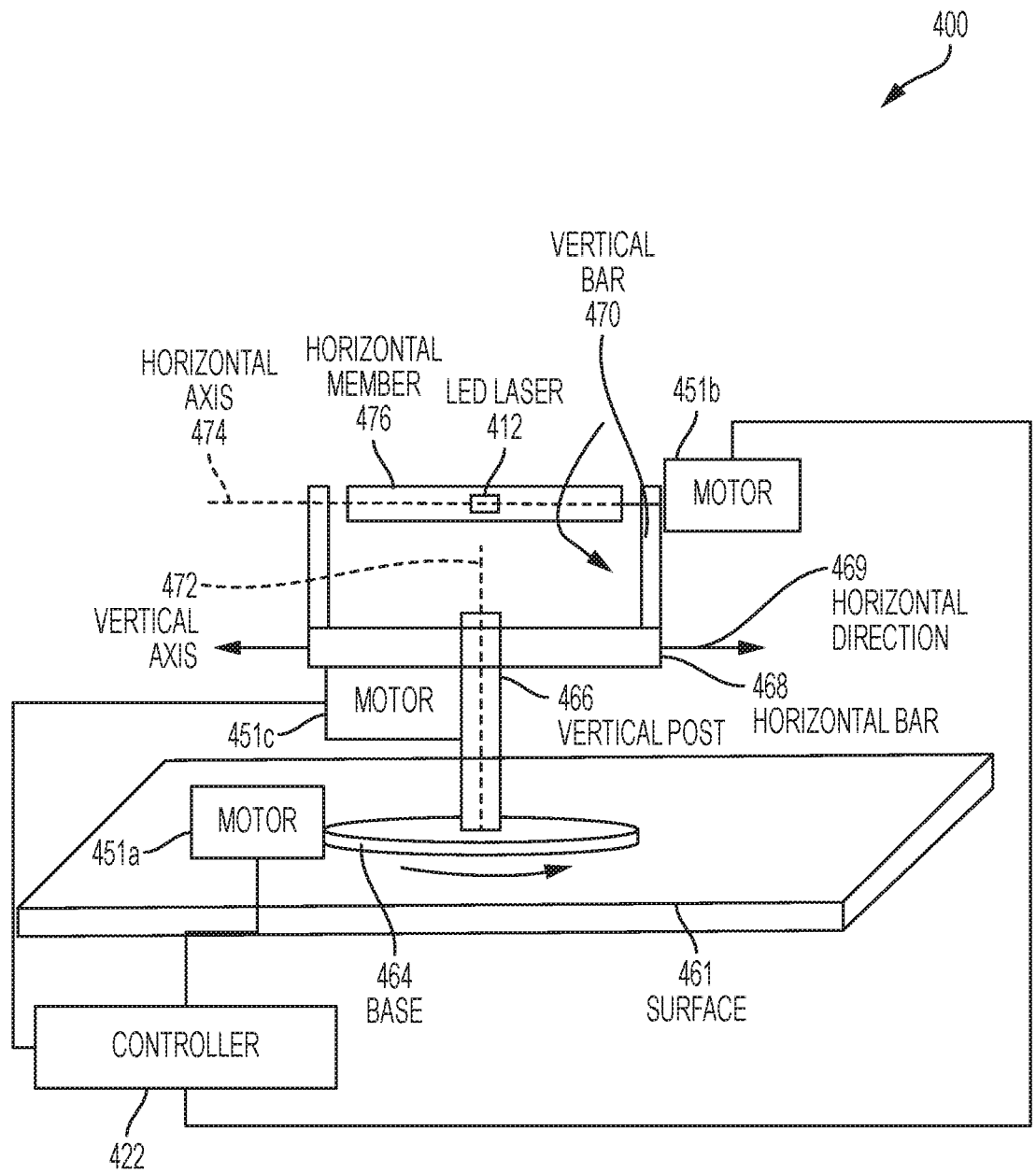
FIG. 4 is a block diagram that illustrates an example of an apparatus to effect an optical barrier to pests, according to still another embodiment.

FIG. 4 is a block diagram that illustrates an example of an apparatus 400 to effect an optical barrier to pests, according to an embodiment. In one embodiment, the apparatus 400 is a gimbal type apparatus. The apparatus 400 includes a base 464 rotatably mounted to a surface 461 in order to rotate the apparatus 400 relative to the surface 461 about a vertical axis 472. In some embodiments, the base 464 is configured to translate the apparatus 400 relative to the surface 461. In an example embodiment, the apparatus 400 is positioned in a vehicle that can be moved relative to the surface 461 to translate the apparatus 400 relative to the surface 461. In an example embodiment, the surface 461 is an interior surface of a room, such as a floor, a wall or a ceiling. A motor 451a is mechanically coupled to the base 464 to rotate the apparatus 400 about the vertical axis 472. The apparatus 400 also includes a vertical post 466 mounted to the base 464 and a horizontal bar 468 mounted to the vertical post 466. A pair of vertical bars 470 are spaced apart and mounted to the horizontal bar 468. A horizontal member 476 is rotatably mounted to the pair of vertical bars 470 such that the horizontal member 476 is configured to rotate about a horizontal axis 474. A motor 451b is mechanically coupled to the horizontal member 476 to rotate the horizontal member 476 in a vertical plane of rotation about the horizontal axis 474. A light source, such as an LED laser 412, is mounted to the horizontal member 476 and rotates with the horizontal member 476. In one embodiment, as with the light source 112 of FIG. 1, the light source of FIG. 4 need not be the LED laser 412 and may be any laser, LED, the sun or any other light source.

In some embodiments, the horizontal bar 468 is moveably mounted to vertical post 466 so that it can move or translate along the horizontal direction 469. In some of these embodiments, a motor 451c is configured to move the horizontal bar 468 in the horizontal direction 469 relative to the vertical post 466.

The terms "horizontal" and "vertical" are used herein to describe various components and orientations. These terms do not describe any particular orientation and instead are merely used to describe a relative orientation with respect to the reference surface 461. In an example embodiment, "horizontal" refers to those components and directions that are substantially parallel to the reference surface 461, whereas "vertical" refers to those components and directions that are substantially orthogonal to the reference surface 461. In an example embodiment, "substantially parallel" means within ±15 degrees of the reference surface 461, and "substantially orthogonal" means within ±15 degrees of an orthogonal direction to the reference surface 461. However, "horizontal" and "vertical" are not limited to this description and include any orientation with respect to the reference surface 461. While three different motors 451a, 451b, 451c are depicted, in some embodiments more or fewer motors are included, or adjustable gearing is employed to ratio the movement of one member relative to the movement of another member, or some combination. In an example embodiment, one or more of the motors 451*a*, 451*b*, 451*c* is a linear or rotational actuator or any actuator known to one skilled in the art.

Figure 5:
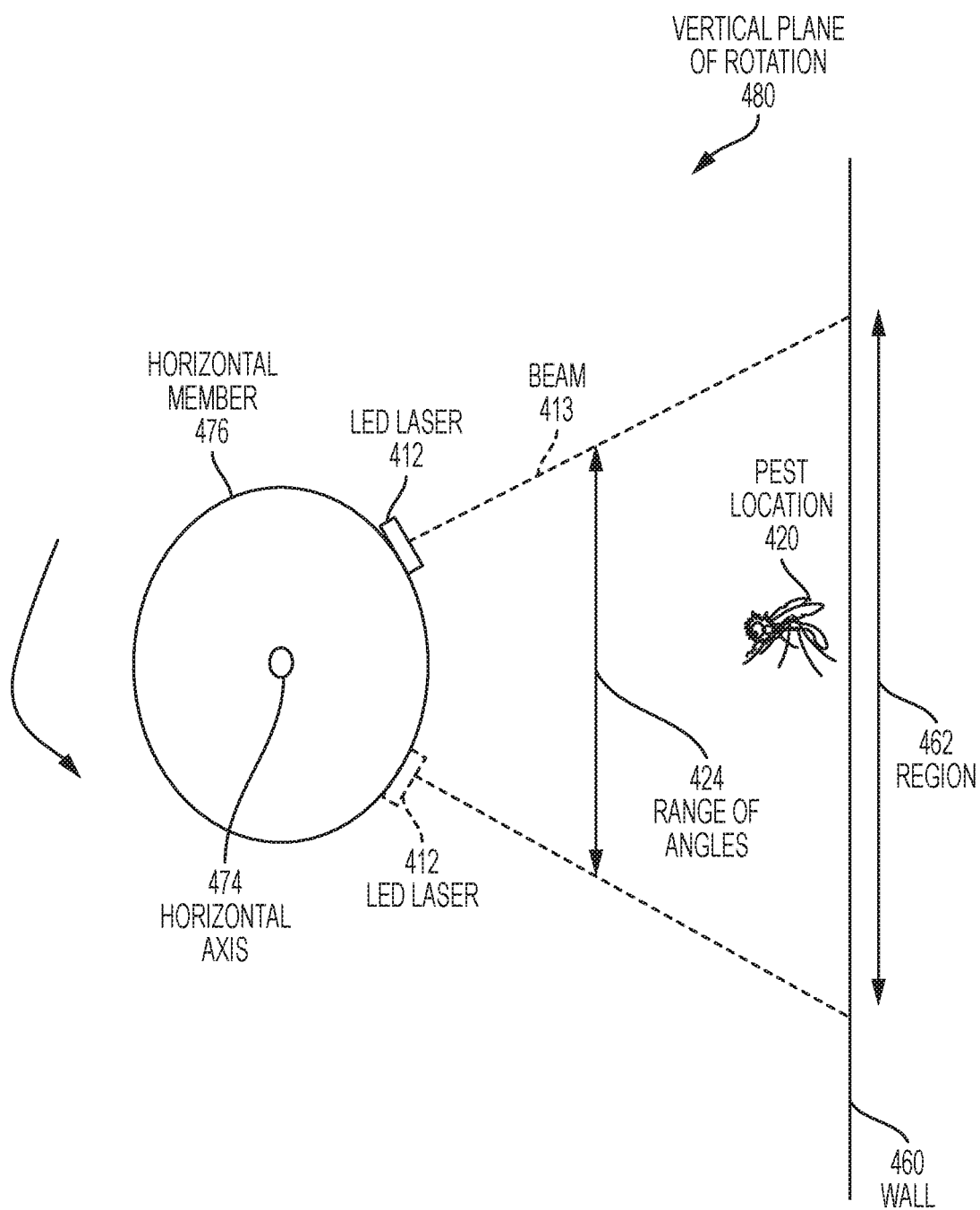
FIG. 5 is a cross-sectional view of the horizontal member of FIG. 4 taken in a vertical plane of rotation.

FIG. 5 is a cross-sectional view of the horizontal member 476 of FIG. 4 taken in a vertical plane of rotation 480. The apparatus 400 includes a LED laser 412 that emits a beam 413. The beam 413 has similar properties as the beam 113 discussed above. In an embodiment, the LED laser 412 is mounted to the horizontal member 476. However, the LED laser 412 can be mounted to any portion of the apparatus 400. The motor 451*b* is configured to rotate the horizontal member 476 in the vertical plane of rotation 480 so that the beam 413 is directed over a range of angles 424 in the vertical plane of rotation 480 that encompass a region 462 on a wall 460. In an embodiment, the range of angles 424 is less than the angle of rotation of the horizontal member 476 in the vertical plane of rotation 480. In some embodiments, the light beam source, such the LED laser 412, rotates a full 360 degrees around the horizontal axis 474, but the light beam source is active only for the range of angles 424. An advantage of this configuration is that rotational momentum need not be changed, thus saving work and reducing both power requirement and mechanical wear and tear.

Figure 6:
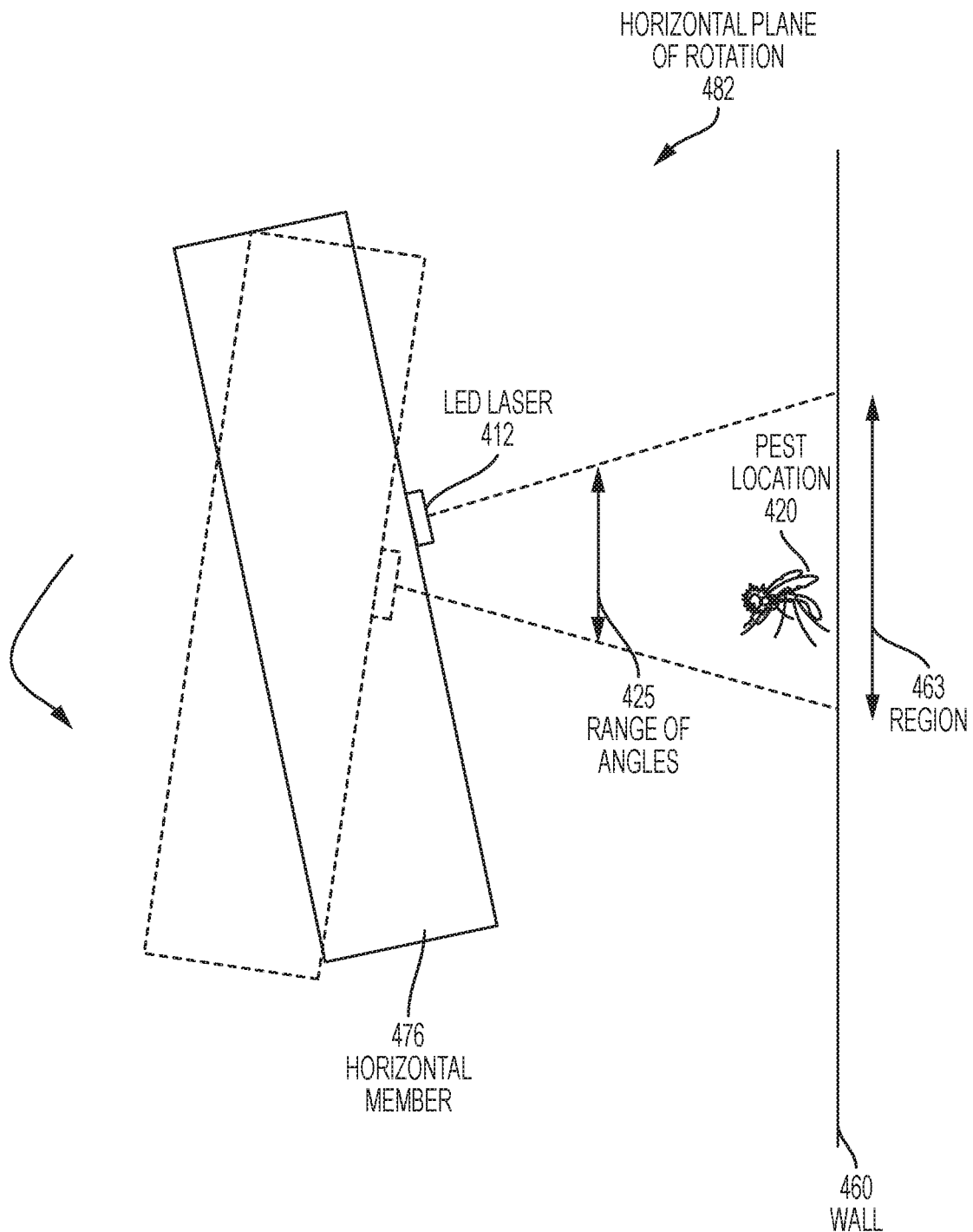
FIG. 6 is a cross-sectional view of the horizontal member of FIG. 4 taken in a horizontal plane of rotation.

FIG. 6 is a cross-sectional view of the horizontal member 476 of FIG. 4 taken in a horizontal plane of rotation 482. The motor 451*a* is configured to rotate the horizontal member 476 (via. the base 464) in the horizontal plane of rotation 482, such that the beam 413 is directed over a range of angles 425 in the horizontal plane of rotation 482 that encompass a region 463 on the wall 460. In an embodiment, the range of angles 425 is less than the angle of rotation of the horizontal member 476 in the horizontal plane of rotation 482. In some embodiments, the horizontal member 476, rotates a full 360 degrees around the vertical axis 472, but the light beam source is active only for the range of angles 425. An advantage of this configuration is that rotational momentum need not be changed, thus saving work and reducing both power requirement and mechanical wear and tear.

Returning to FIG. 4, the apparatus 400 also includes a controller 422 including a memory where a location 420 of a pest is stored. In an example embodiment, the apparatus 400 includes a sensor system similar to the sensor system 310, to determine the location 420 of the pest. Based on the location 420 of the pest, the controller 422 determines whether the range of angles 424 in the vertical plane of rotation 480 and/or the range of angles 425 in the horizontal plane of rotation 482 include the pest location 420. The controller 422 then outputs a signal to the motor 451*b* to rotate the horizontal member 476 such that the beam 413 is swept over the range of angles 424 in the vertical plane of rotation 480 and/or to the motor 451*a* to rotate the horizontal member 476 such that the beam 413 is swept over the range of angles 425 in the horizontal plane of rotation 482. In a first example, the controller 422 determines that the region 462 (i.e. range of angles 424 within the vertical plane of rotation 480) includes the pest location 420 and outputs a signal to the motor 451*b* to rotate the horizontal member 476 in the vertical plane of rotation 480 such that the beam 413 is swept over the range of angles 424. In a second example, the controller 422 determines that the region 463 (i.e. range of angles 425 within the horizontal plane of rotation 482) includes the pest location 420 and outputs a signal to the motor 451*a* to rotate the horizontal member 476 in the horizontal plane of rotation 482 such that the beam 413 is swept over the range of angles 425. In a third example, the controller 422 determines that both regions 462, 463 (i.e. both ranges of angles 424, 425 within both planes of rotation 480, 482) encompass the pest location 420 and outputs signals to the motors 451*a*, 451*b* to rotate the horizontal member 476 in the vertical and horizontal planes of rotation 480, 482 such that the beam 413 is swept over the ranges of angles 424, 425 in both planes of rotation 480, 482. Although FIGS. 5-6 depict ranges of angles 424, 425, in one embodiment the controller 422 outputs a signal to the motor 451*b* and/or motor 451*a* to direct the beam 413 in a single angle oriented at the pest location 420.

In an embodiment, the apparatus 400 includes the motor 451*c* mechanically coupled to the horizontal bar 468 to laterally shift the horizontal bar 468 in the horizontal direction 469 with respect to the base 464 and the surface 461. In this embodiment, based on the location 420 of the pest, the controller 422 determines how far to laterally shift the horizontal bar 468 in the horizontal direction 469 such that the beam 413 is swept over a range of angles that include the location 420 of the pest. The controller 422 then outputs a signal to the motor 451*c* to laterally shift the horizontal bar 468 in the horizontal direction 469 such that the beam 413 is swept over the range of angles that include the pest location 420. In an example embodiment, the controller 422 determines how far to laterally shift the horizontal bar 468 in the horizontal direction 469 such that the LED laser 412 is horizontally aligned with the pest location 420. In this example embodiment, the controller 422 then outputs a signal to the motor 451*c* to laterally shift the horizontal bar 468 in the horizontal direction 469 such that the LED laser 412 is horizontally oriented with the pest location 420.

In some embodiments, the controller obtains an area to be kept clear and continually paints that area with the light beam to prevent pests from occupying that area regardless of the actual location of one or more pests, but rather based on a start time and end time to keep the area clear. The area and start time and end time can be predetermined on a schedule and stored in memory, or calculated based on observations of pest behavior, or entered manually by an operator, or some combination.

Figure 7:
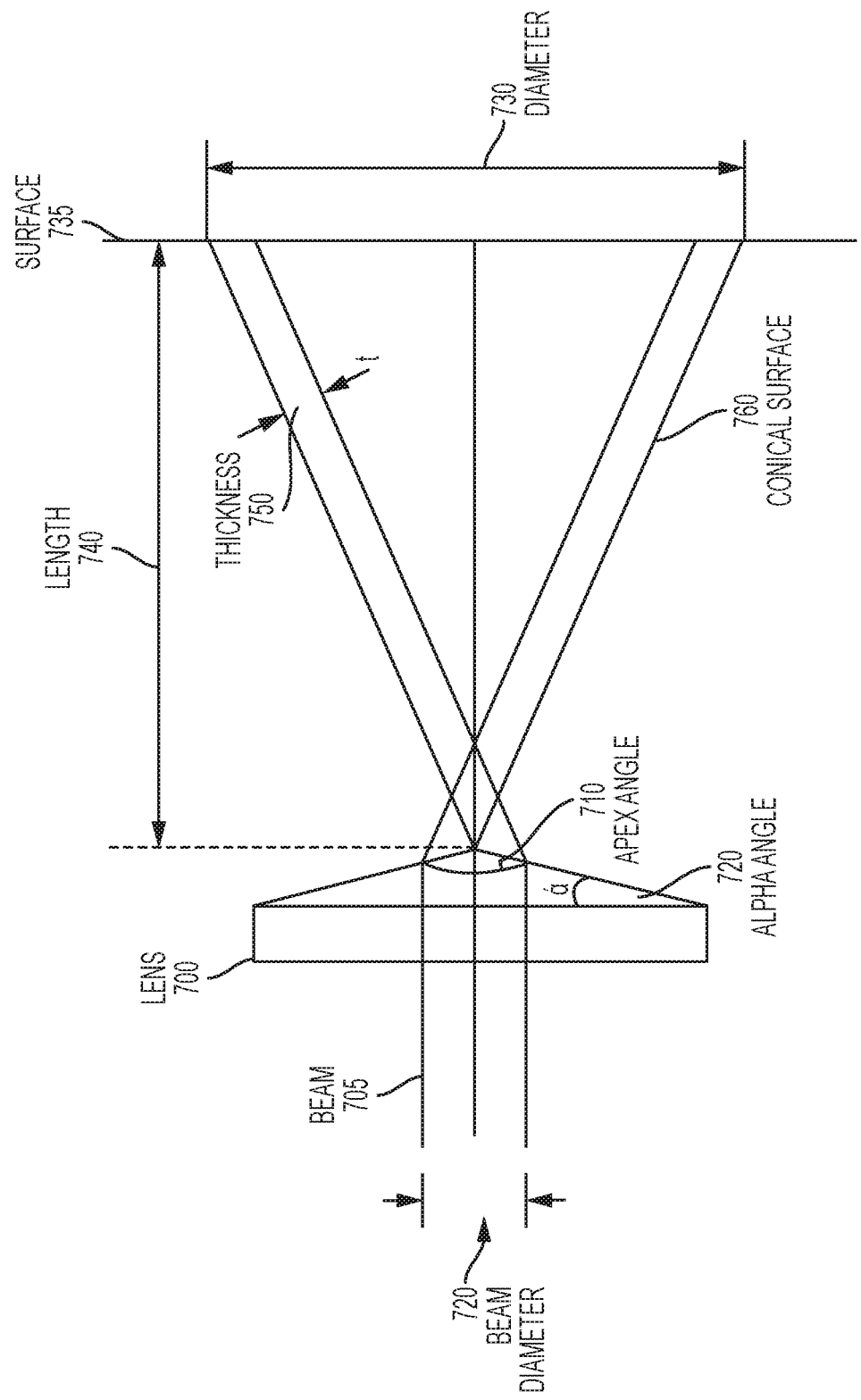
FIG. 7 is a cross-sectional view of a lens used to spread a beam from a laser to a fan shaped optical barrier to pests, according to one embodiment.

FIG. 7 is a cross-sectional view of a lens 700 used to spread a beam 705 from a light source to form a fan or conical shaped optical barrier to pests, according to one embodiment. In an example embodiment, the lens 700 is an axicon or equivalent Fresnel lens. As depicted in FIG. 7, the lens 700 is characterized by an apex angle 710 and an alpha angle 720. The beam 705 has an initial beam diameter 720 and is focused across the optical axis to form a conical surface 760 with an outer diameter 730 on a surface 735. A thickness 750 of the conical surface 760 can be determined, based on the initial beam diameter 720 by:

$$t = \frac{d_b}{2} \quad (1)$$

where t is the thickness 750 of the conical surface 760 and $d_b$ is the initial beam diameter 720. Additionally, the outer diameter 730 of the conical surface 760 can be determined by:

$$d_r = 2 \, L \, \tan[(n-1)\alpha] \quad (2)$$

where $d_r$ is the outer diameter 730, L is a length 740 from the lens 700 to the surface 735, n is an index of refraction of the lens 700 and α is the alpha angle 720. In another example embodiment, a cylindrical axicon-like lens can be used to create a light wall. One or more parameters of the lens 700 can be adjusted to generate the conical surface 760 to serve as an optical barrier to pests.

2. Experimental Embodiments

Figure 8:
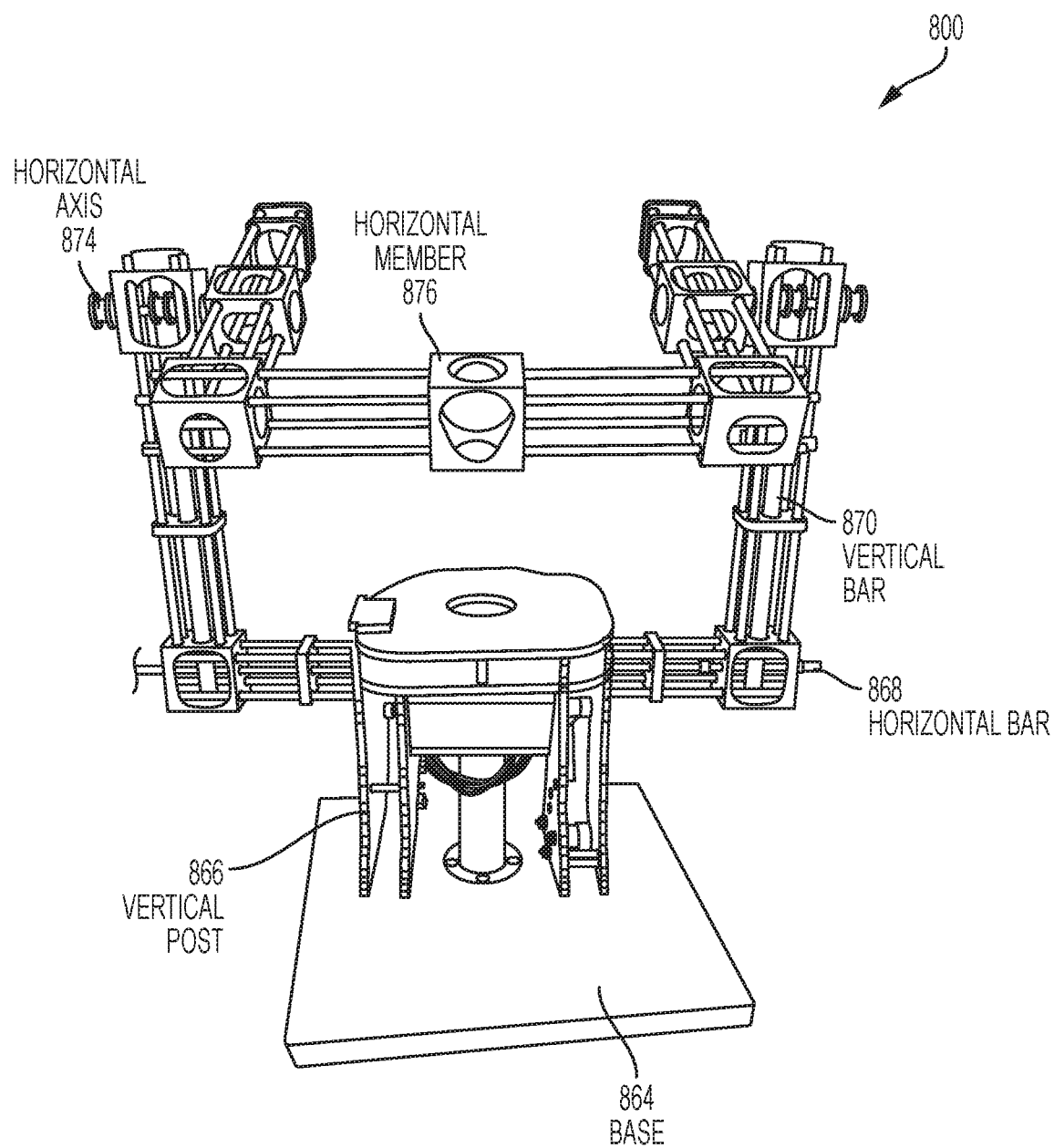
FIG. 8 is a perspective view that illustrates an example of an apparatus to effect an optical barrier to pests, according to still another embodiment.

FIG. 8 is a perspective view that illustrates an example of an apparatus 800 to effect an optical barrier to pests, according to still another embodiment. In one embodiment, the apparatus 800 is a gimbal type apparatus. The apparatus 800 is a functional embodiment of the apparatus 400 of FIG. 4 including a base 864 that is similar to the base 464; vertical post 866 similar to vertical post 466, horizontal bar 868 similar to horizontal bar 468, a pair of spaced apart vertical bars 870 that are similar to the vertical bars 470 and a horizontal member 876 configured to rotate about a horizontal axis 874 that is similar to the horizontal member 476 configured to rotate about the horizontal axis 474. Here the horizontal member 876 is offset from the horizontal axis 874

Figure 9:
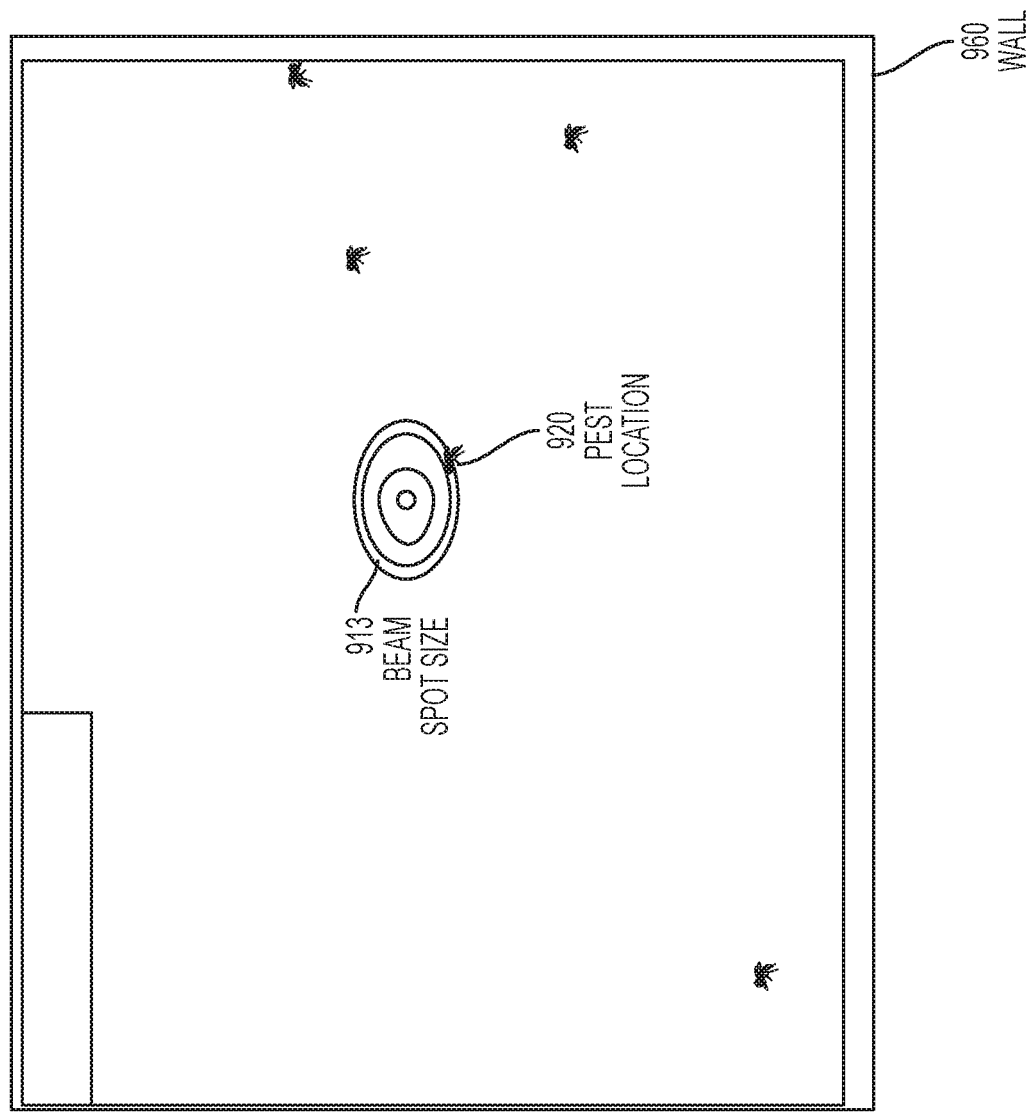
FIG. 9 is a front view that illustrates an example of a beam spot size for an optical barrier and a pest on a surface, according to an embodiment.

FIG. 9 is a front view that illustrates an example of a beam spot size 913 for an optical barrier and a pest on a surface, according to an embodiment. In an embodiment, the surface is a wall 960 that is similar to the wall 460 of FIGS. 5-6. In this embodiment, the optical barrier is formed by the temporal sweep of a light source, such as a LED or a laser beam, such as the laser beam 413 depicted in FIGS. 5-6 using the apparatus 800 of FIG. 8. The beam spot size 913 depicts the size of the laser beam 413 at one instant as it is scanned along the wall 960. The pest location 920 depicts the relative size of the pest, compared to the beam spot size 913.

Figure 10A:
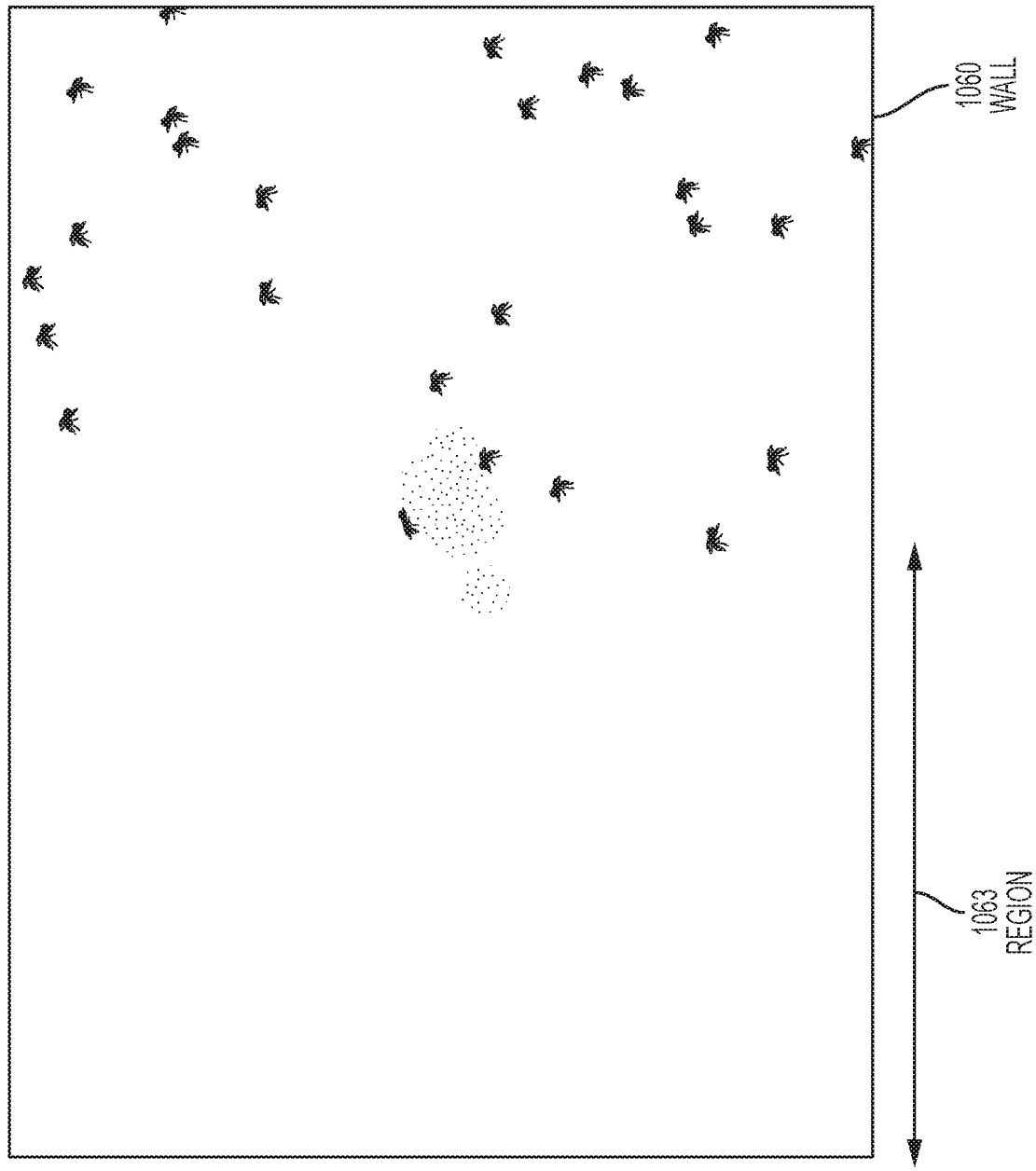
FIG. 10A is a front view that illustrates an example of a surface partially scanned by an optical barrier, according to an embodiment.

FIG. 10A is a front view that illustrates an example of a surface partially scanned (and thus swept) by an optical barrier, according to an embodiment. In an embodiment, the surface is a wall 1060 that is similar to the wall 460 of FIGS. 5-6. In an embodiment, the optical barrier is swept out by a laser beam such as the laser beam 413 depicted in FIGS. 5-6 with the spot size of FIG. 9 using the apparatus 800 of FIG. 8. As shown in FIG. 10A, after scanning a region 1063 of the wall 1060 with the laser beam 413, the region 1063 is absent of pests. Additionally, pests remain in the unscanned region of the wall 1060.

In other embodiments, the pests can be kept captive within a three-dimensional chamber, where an optical barrier separates the chamber into a first region and a second region. In one embodiment, the optical barrier keeps the pests captive within the first region of the chamber such that the second region of the chamber is absent of pests. In other embodiments, more than one optical barrier can be used to divide the chamber into more than two regions, to keep the pests captive within more than one region and/or such that more than one region is absent of pests. FIG. 10B is a front view that illustrates an example of a time lapse travel path 1064 of pests along a thin chamber 1066 before an optical barrier is established to separate the chamber 1066 into the first and second regions. In one embodiment, the optical barrier is established at the center of the chamber 1066. In some embodiments, the time lapse travel path 1064 represents a collective path of the pests over a time lapse period, such as 10 minutes. As shown in FIG. 10B, prior to establishing the optical barrier, the time lapse travel path 1064 of the pests covers the entire chamber 1066 and thus the pests freely move over the entire chamber 1066. FIG. 10C is a front view that illustrates an example of a time lapse travel path 1064' of pests along the chamber 1066 after the optical barrier is established and divides the chamber 1066 into a first region 1068a and a second region 1068b. In some embodiments, the travel path 1064' of the pests is blocked by the optical barrier along the center of the chamber 1066 such that the second region 1068b of the chamber 1066 remains absent of pests and the pests are kept captive within the first region 1068a. In some embodiments, the time lapse travel path 1064' represents a collective path of pests over the time lapse period as the chamber 1066 is divided with the laser beam 403. As shown in FIG. 10C, the travel path 1064' of the pests does not encompass the second region 1068b and thus pests do not pass into the second region 1068b when the chamber 1066 is divided with the laser beam 403. Although FIG. 10C depicts that some pests initially entered the second region 1068b, these pests quickly turned away and exited the second region 1068b. In an example embodiment, the travel paths 1064, 1064' indicate actual flight paths of *Anopheles gambiae* pests.

Figure 11:
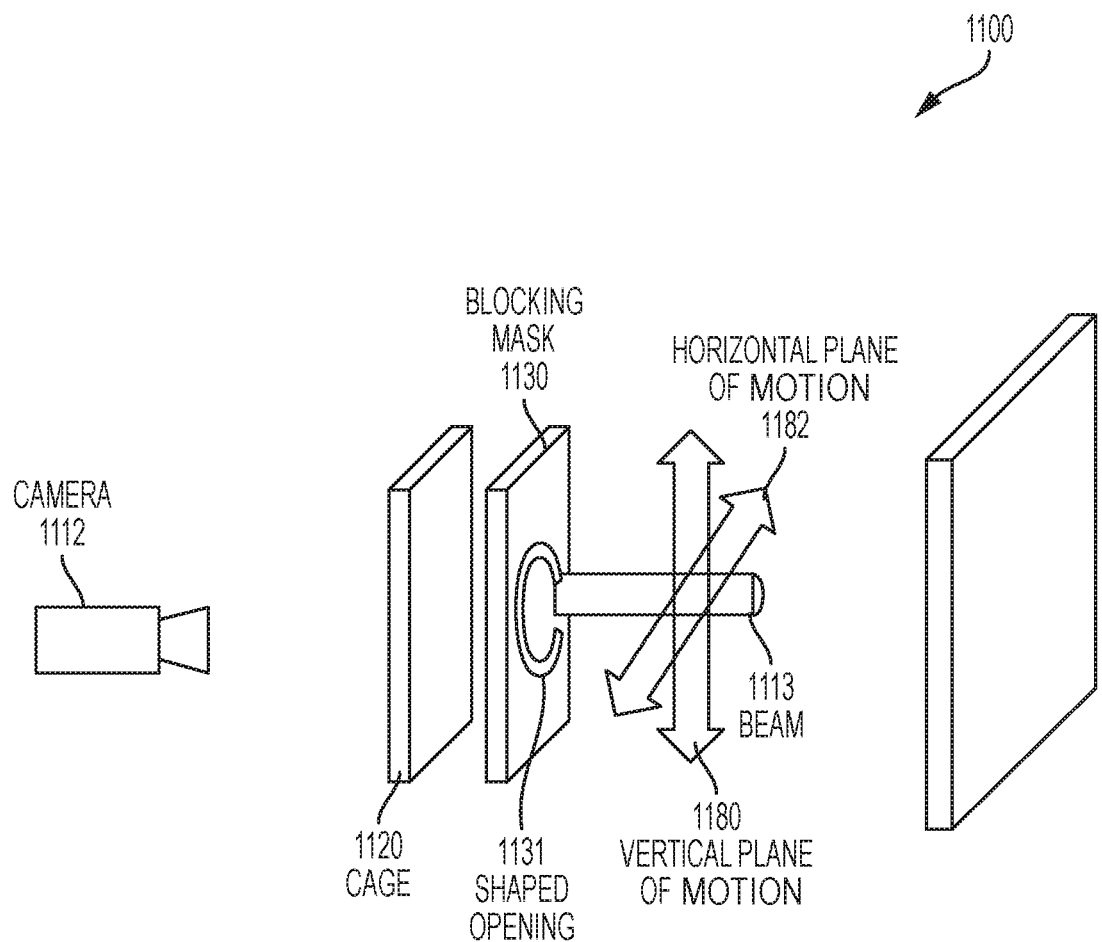
FIG. 11 is a block diagram that illustrates an example of an apparatus to effect an optical barrier to pests, according to still another embodiment.

FIG. 11 is a block diagram that illustrates an example of an apparatus 1100 to effect an optical barrier to pests, according to still another embodiment. The apparatus 1100 includes a light source (not shown) that emits a beam 1113 directed at a blocking mask 1130 with a shaped opening 1131 to selectively transmit light on the shaped opening 1131. In the specific embodiment of FIG. 11, the shaped opening 1131 takes the form of a letter, i.e. "C", however the shaped opening 1131 is not limited to any particular form. In one embodiment, the beam 1113 illuminates the blocking mask 1130 such that only those portions of the beam 1113 incident on the shaped opening 1131 are transmitted through the blocking mask 1130 and illuminate a cage 1120 enclosing pests based on the shaped opening 1131. The light source is a laser such as the laser 412 of FIG. 4 and the beam 1113 is moved through the shaped opening 1131 in a vertical plane of motion 1180 and/or horizontal plane of motion 1182, using similar mechanisms as discussed in the apparatus 400 of FIGS. 4-6. In some embodiments, the beam 1113 is swept through the shaped opening in a vertical plane of rotation 1180 and/or a horizontal plane of rotation 1182. In other embodiments, the beam 1113 is moved through the shaped opening in a vertical plane of translation and/or a horizontal plane of translation. A camera 1112 is provided, to capture one or more images of the cage 1120, upon illumination of the cage 1120 by the swept beam 1113. In an embodiment, upon illumination by the swept beam 1113, the regions of the cage 1120 corresponding to the shaped opening 1131 are absent of pests and the regions of the cage 1120 not corresponding to the shaped opening 1131 include pests. In an example embodiment, one or more images from the camera 1112 are captured before and after the moving of the beam 1113 to confirm a migration of the pests away from regions of the cage 1120 corresponding to the shaped opening 1131.

Figures 12A, 12B:
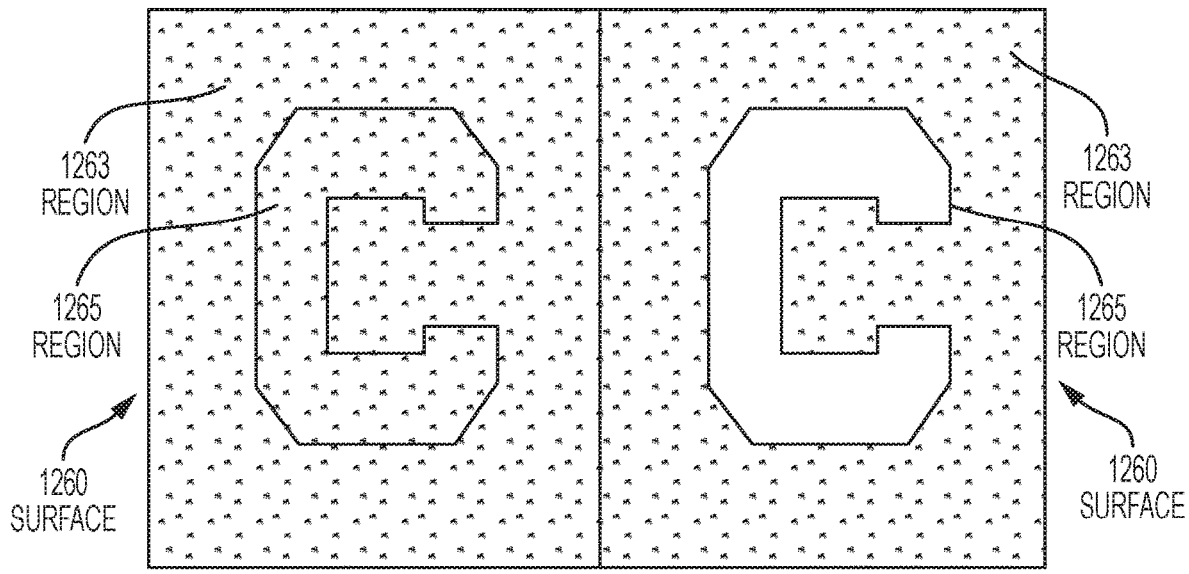
FIG. 12A is a front view that illustrates an example of a surface populated by pests, according to an embodiment.
FIG. 12B is a front view that illustrates the surface of FIG. 12A after scanning one region of the surface, according to an embodiment.
Figure 12C:
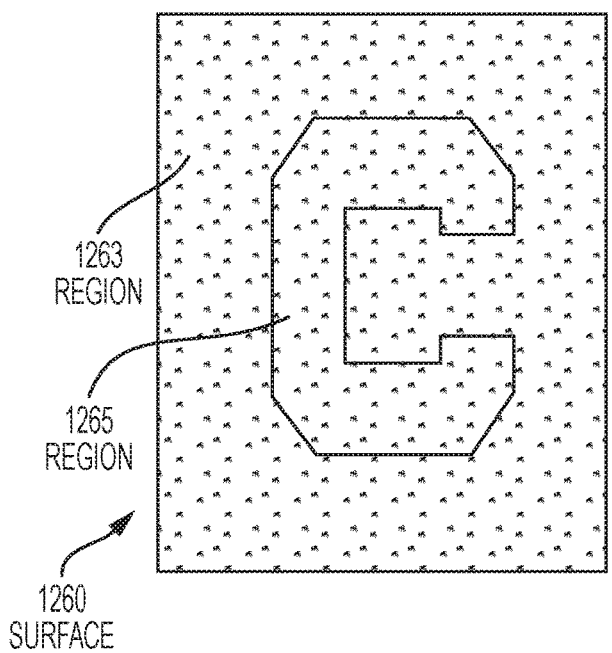
FIG. 12C is a front view that illustrates the surface of FIG. 12B after removal of the optical barrier, according to an embodiment.
Figure 13:
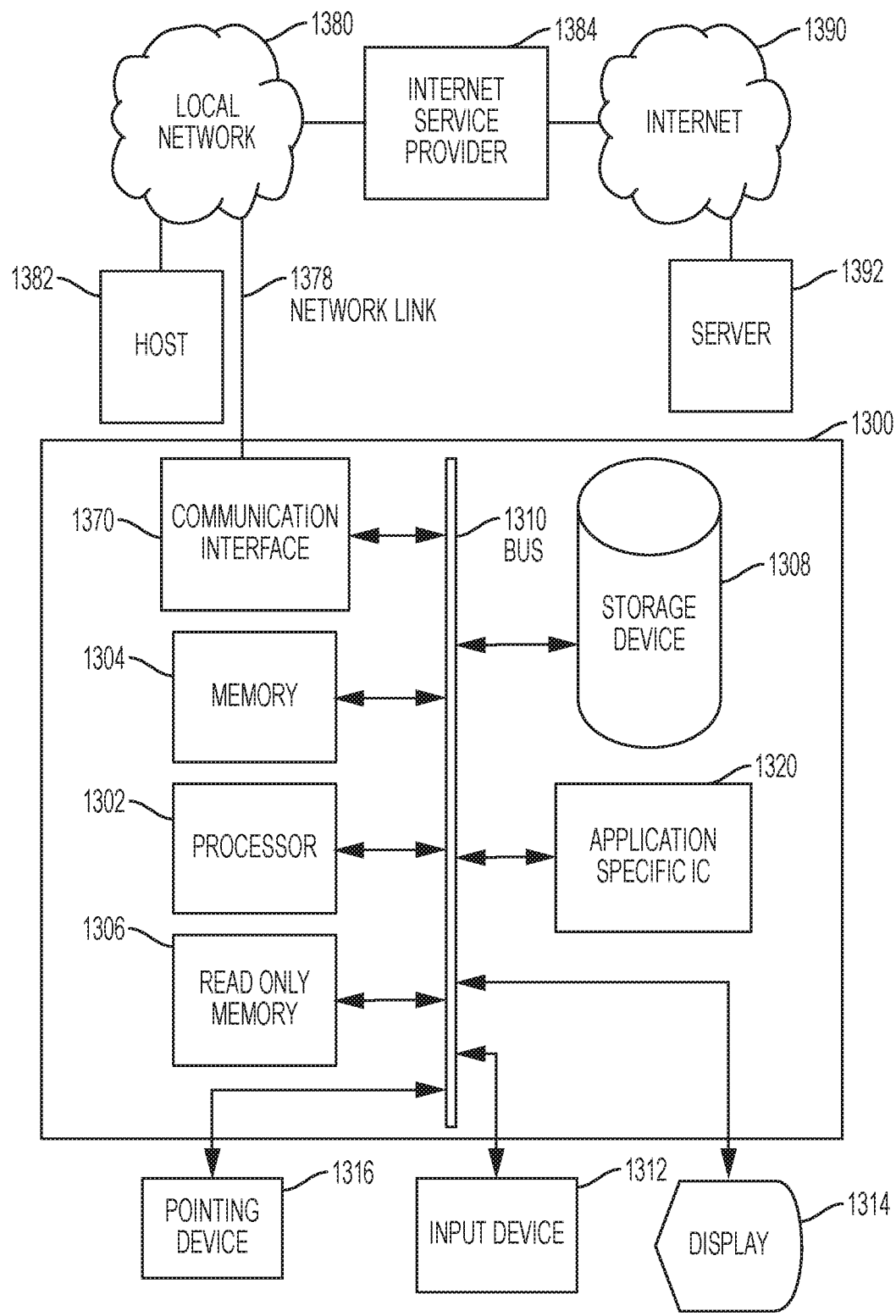
FIG. 13 is a block diagram that illustrates a computer system upon which an embodiment of the invention may be implemented.

FIG. 12A is a front view that illustrates an example of a surface 1260 populated by pests, according to an embodiment. The surface 1260 includes a first region 1263 and a second region 1265, where the second region 1265 has a predetermined shape and the first region 1263 is outside of the second region 1265. In the example embodiment, the second region 1265 is defined by a shape of a letter (e.g. "C") but the second region 1265 is not limited to any particular predetermined shape. FIG. 12A depicts the surface 1260 after the surface 1260 has been agitated and the pests have settled and are evenly distributed over the first and second regions 1263, 1265, prior to scanning the surface 1260. FIG. 12B is a front view that illustrates the surface 1260 of FIG. 12A after scanning the second region 1265 of the surface 1260, according to an embodiment. In an embodiment, the second region 1265 of the surface 1260 is scanned with an optical barrier according to one of the embodiments discussed herein. As depicted in FIGS. 12B, the pests have entirely migrated from the second region 1265 to the first region 1263 after scanning the section region 1265. FIG. 12C is a front view that illustrates the surface 1260 of FIG. 12B after removal of the optical barrier, according to an embodiment. As shown in FIG. 12C, after deactivating the optical barrier and agitating the surface 1260, the pests have settled and are evenly distributed among the first and second regions 1263, 1265. This demonstrates that factors other than the optical wavelength of the optical barrier, such as increased temperature at the second region 1265 due to scanning, do not contribute to the migration of pests from the second region 1265.

3. Processing Hardware Overview

FIG. 13 is a block diagram that illustrates a computer system 1300 upon which an embodiment of the invention may be implemented. Computer system 1300 includes a communication mechanism such as a bus 1310 for passing information between other internal and external components of the computer system 1300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of one or more methods described herein.

A sequence of binary digits constitutes digital data that is used to represent a number or code for a character. A bus 1310 includes many parallel conductors of information so that information is transferred quickly among devices coupled to the bus 1310. One or more processors 1302 for processing information are coupled with the bus 1310. A processor 1302 performs a set of operations on information. The set of operations include bringing information in from the bus 1310 and placing information on the bus 1310. The set of operations also typically include comparing two or more units of information, shifting positions of units of information, and combining two or more units of information, such as by addition or multiplication. A sequence of operations to be executed by the processor 1302 constitutes computer instructions.

Computer system 1300 also includes a memory 1304 coupled to bus 1310. The memory 1304, such as a random access memory (RAM) or other dynamic storage device, stores information including computer instructions. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of computer instructions. The computer system 1300 also includes a read only memory (ROM) 1306 or other static storage device coupled to the bus 1310 for storing static information, including instructions, that is not changed by the computer system 1300. Also coupled to bus 1310 is a non-volatile (persistent) storage device 1308, such as a magnetic disk or optical disk, for storing information, including instructions, that persists even when the computer system 1300 is turned off or otherwise loses power.

Information, including instructions, is provided to the bus 1310 for use by the processor from an external input device 1312, such as a keyboard containing alphanumeric keys operated by a human user, or a sensor. A sensor detects conditions in its vicinity and transforms those detections into signals compatible with the signals used to represent information in computer system 1300. Other external devices coupled to bus 1310, used primarily for interacting with humans, include a display device 1314, such as a cathode ray tube (CRT) or a liquid crystal display (LCD), for presenting images, and a pointing device 1316, such as a mouse or a trackball or cursor direction keys, for controlling a position of a small cursor image presented on the display 1314 and issuing commands associated with graphical elements presented on the display 1314.

In the illustrated embodiment, special purpose hardware, such as an application specific integrated circuit (IC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1370 sends and receives electrical, acoustic or electromagnetic signals, including infrared and optical signals, that carry information streams, such as digital data.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1302, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1302, except for carrier waves and other signals.

Logic encoded in one or more tangible media includes one or both of processor instructions on a computer-readable storage media and special purpose hardware, such as ASIC*1320.

Network link 1378 typically provides information communication through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390. A computer called a server 1392 connected to the Internet provides a service in response to information received over the Internet. For example, server 1392 provides information representing video data for presentation at display 1314.

The invention is related to the use of computer system 1300 for implementing the techniques described herein. According to one embodiment of the invention, those techniques are performed by computer system 1300 in response to processor 1302 executing one or more sequences of one or more instructions contained in memory 1304. Such instructions, also called software and program code, may be read into memory 1304 from another computer-readable medium such as storage device 1308. Execution of the sequences of instructions contained in memory 1304 causes processor 1302 to perform the method steps described herein. In alternative embodiments, hardware, such as application specific integrated circuit 1320, may be used in place of or in combination with software to implement the invention. Thus, embodiments of the invention are not limited to any specific combination of hardware and software.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server 1392 transmits program code for a particular application, requested by a message sent from computer 1300, through Internet 1390, ISP equipment 1384, local network 1380 and communications interface 1370. The received code may be executed by processor 1302 as it is received, or may be stored in storage device 1308 or other non-volatile storage for later execution, or both. In this manner, computer system 1300 may obtain application program code in the form of a signal on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red a carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

Figure 14:
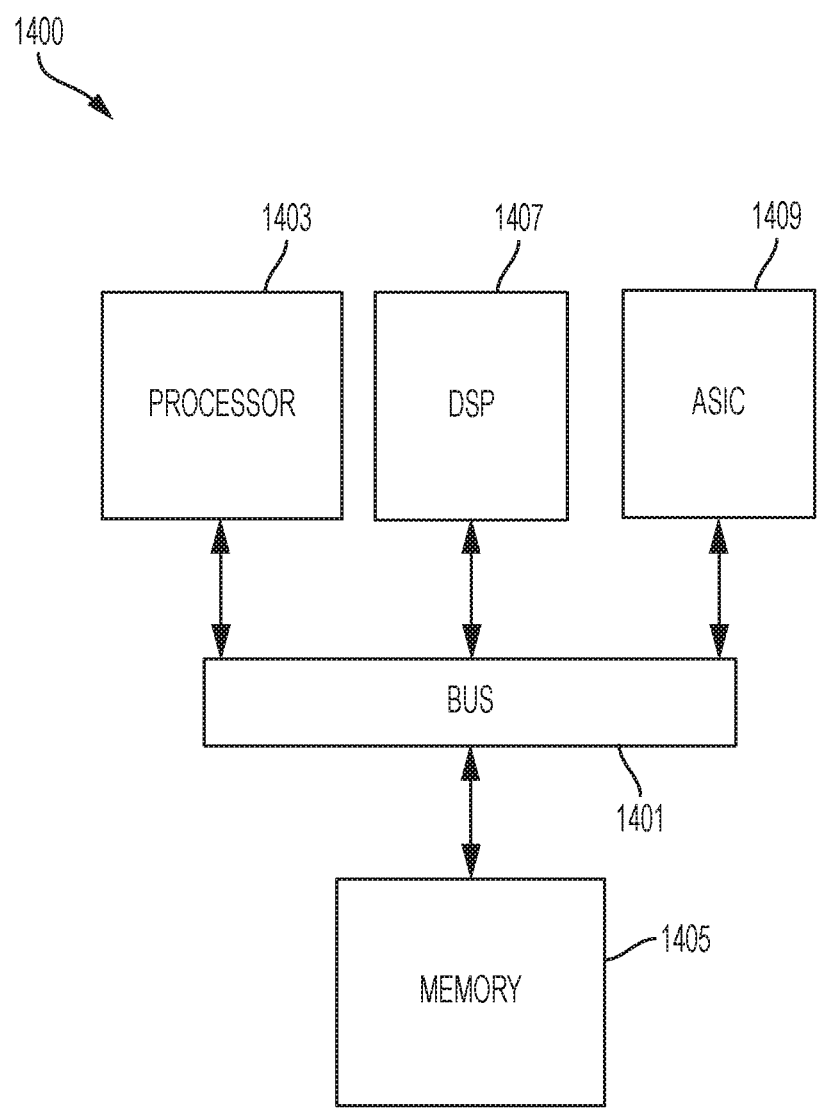
FIG. 14 is a block diagram that illustrates a chip set upon which an embodiment of the invention may be implemented.

FIG. 14 illustrates a chip set 1400 upon which an embodiment of the invention may be implemented. Chip set 1400 is programmed to perform one or more steps of a method described herein and includes, for instance, the processor and memory components described with respect to FIG. 2 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1400, or a portion thereof, constitutes a means for performing one or more steps of a method described herein.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1405 also stores the data associated with or generated by the execution of one or more steps of the methods described herein.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value.

What is claimed is:

1. An apparatus comprising:
   a base rotatably mounted to a surface to translate the apparatus or rotate the apparatus relative to the surface about a vertical axis;
   a horizontal bar mounted to the base;
   a pair of vertical bars mounted to the horizontal bar;
   a horizontal member rotatably mounted to the pair of vertical bars such that the horizontal member is configured to rotate about a horizontal axis;
   a sensor configured to indicate a location of a pest;
   a light source emitting a beam, wherein the beam has an optical wavelength in a near infrared (NIR) band;
   an actuator configured to rotate at least one of the base and the horizontal member to direct the beam in a range of angles in at least one plane of rotation;
   at least one processor; and
   at least one memory chip including one or more sequences of instructions and data that indicates the location of the pest less than the total locations where the beam can be swept;
   the at least one memory chip and the one or more sequences of instructions configured to cause the processor to operate the actuator to rotate the at least one of the base and the horizontal member to direct the beam to sweep through the range of angles that include the location of the pest.

2. The apparatus of claim 1, wherein the actuator is further configured to laterally shift the horizontal bar relative to the base in a horizontal direction to direct the beam into the range of angles.

3. The apparatus of claim 1, wherein the at least one memory and the one or more sequences of instructions are configured to cause the processor to operate the actuator to rotate the base and the horizontal member to direct the beam to sweep through the range of angles including a first range of angles in a horizontal plane of rotation and a second range of angles in a vertical plane of rotation.

4. The apparatus of claim 1, wherein the range of angles is less than a rotation angle of the at least one of the base and the horizontal member.

5. The apparatus of claim 1, wherein the sweep includes a single angle.

6. The apparatus of claim 1, wherein the sweep extends from a first angle to a second angle to cover a region on a distant wall.

7. The apparatus of claim 1, wherein the surface is a floor, wall or ceiling of a room.

8. The apparatus of claim 1, wherein the light source is mounted to the horizontal member.

9. The apparatus of claim 1, wherein the NIR band is in a range of 800-870 nanometers (nm).

10. The apparatus of claim 1, wherein the beam has a dispersion angle of less than 10 degrees.

11. The apparatus of claim 1, wherein the light source is selected from a group comprising a laser, a light emitting diode (LED) and the sun.

12. The apparatus of claim 1, wherein the sensor is part of a sensor system that indicates the location of the pest.

* * * * *